(12) United States Patent
Kiser et al.

(10) Patent No.: US 8,182,096 B2
(45) Date of Patent: May 22, 2012

(54) COOLING SYSTEM FOR DISPLAY DEVICE

(75) Inventors: David Kerry Kiser, Sherwood, OR (US); Ronald Ferguson, Grants Pass, OR (US)

(73) Assignee: Seiko Epson Corporation, Tokyo (JP)

( * ) Notice: Subject to any disclaimer, the term of this patent is extended or adjusted under 35 U.S.C. 154(b) by 360 days.

(21) Appl. No.: 12/434,551

(22) Filed: May 1, 2009

(65) Prior Publication Data
US 2009/0273761 A1   Nov. 5, 2009

Related U.S. Application Data

(60) Provisional application No. 61/050,140, filed on May 2, 2008.

(51) Int. Cl.
| | |
|---|---|
| G03B 21/18 | (2006.01) |
| G03B 21/16 | (2006.01) |
| G03B 21/14 | (2006.01) |
| G03B 21/22 | (2006.01) |
| F28D 11/00 | (2006.01) |
| F28F 5/00 | (2006.01) |

(52) U.S. Cl. ............................. 353/61; 353/119; 165/86

(58) Field of Classification Search .................. 353/119, 353/60, 61, 122, 52, 57, 58, 101, 54; 165/55, 165/77, 86, 46; 348/748
See application file for complete search history.

(56) References Cited

U.S. PATENT DOCUMENTS
| | | | | |
|---|---|---|---|---|
| 7,278,469 | B2 * | 10/2007 | Sasaki et al. | 165/104.26 |
| 2005/0088631 | A1 * | 4/2005 | Dwyer et al. | 353/101 |
| 2007/0091276 | A1 * | 4/2007 | Zakoji et al. | 353/54 |

\* cited by examiner

Primary Examiner — William C Dowling
Assistant Examiner — Ryan Howard
(74) Attorney, Agent, or Firm — Kilpatrick Townsend & Stockton LLP

(57) ABSTRACT

Systems and methods for a cooling system of a display device are provided herein. One exemplary image display device includes a light source and an image-generation device for receiving light from the light source and generating an image. The image display device also includes a projection lens for projecting the image from the image-generation device. The image display device also includes a body for housing the light source, the image generation device, and the projection lens. The image display device also includes a cooling system coupled to the body. The cooling system may be positionable in a first position and a second position based on a configuration of the body.

17 Claims, 6 Drawing Sheets

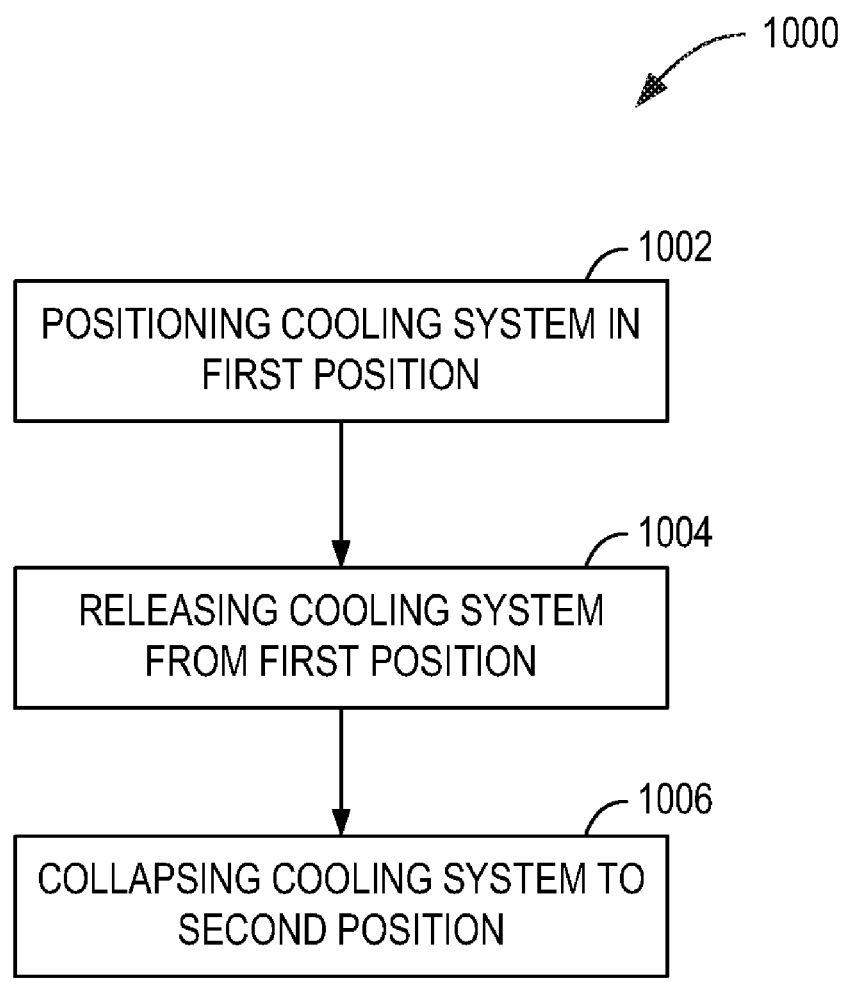

COOLING SYSTEM FOR DISPLAY DEVICE

CROSS-REFERENCE TO RELATED APPLICATIONS

This application claims priority from U.S. Provisional Patent Application No. 61/050,140 of David Kerry Kiser and Ronald Ferguson, entitled "COOLING SYSTEM FOR DISPLAY DEVICE," filed May 2, 2008, the disclosure of which is hereby incorporated by reference in its entirety and for all purposes.

FIELD

The present application relates to systems, apparatus and methods for cooling a display device, and more specifically, to a cooling system for an image display device.

BACKGROUND AND SUMMARY

Image display devices, also referred to herein as image device, may be used in a variety of environments. For example, information display devices including televisions, monitors, and projectors may be adapted to display images, including text, graphics, video images, still images, presentations, etc. Such image devices may be found in home environments and applications, education environment and applications, business facilities, conference rooms and other meeting facilities, etc. The following is a non-exhaustive list of exemplary image devices: cathode ray tubes (CRTs), projectors, flat panel liquid crystal displays (LCDs) systems, light emitting diode (LED) systems, plasma systems, front projection systems, rear projection systems, LCD monitors, etc. Large format display devices may include televisions, front-projection systems, and rear-projections systems, as just some examples.

The images or content displayed on the image display devices may be provided by a plurality of different content sources. For example, content may be provided by content sources or remote computing devices, including computers, laptop computers, personal computers, storage mediums, such as memory cards and other memory devices, cameras, telephones, Smartphones, portable data assistants, etc. Image data from the content source may be transmitted to the display device directly or through a network. The content source may be connected, e.g. wired or wirelessly, to the image device for display of the content. Further, the image displayed by the image display device may be outputted to a display surface, such as a screen.

Typically, image display devices include a light assembly, including one or more light sources, such as LEDs, linked to a light engine or optical engine. Light may be directed from the light assembly through the light engine, and then through a projection lens to a display surface.

The temperatures within an operating image display device (e.g., a projection device) may be of concern. If temperatures exceed predetermined temperature thresholds (e.g, a critical threshold), portions of the device may malfunction and/or have a shorter life span. Thus, it may be desirable to maintain temperatures within, or outside, a projection device at operating levels to prevent the projection device from malfunctioning and to prevent early replacement of parts. It may be desirable to cool both the electronics and the light assembly, such as the LEDs, within the projection device. To enable sufficient cooling, a projection device, or image display device, may have to accommodate blowers and other cooling solutions in a box. However, such cooling solutions may prevent significant reduction in the size of an image display device.

The inventors herein have recognized that display systems having a minimized footprint (e.g., a bottom surface area) and minimized height may be difficult to cool as the prior fixed-sized cooling solutions have generally prevented reduction in the size of the display system footprint and height. In one example, the inventors have identified systems and methods for incorporating a collapsible cooling system into a reduced sized display system. One exemplary image display device includes a light source and an image-generation device for receiving light from the light source and generating an image. The image display device may also include a projection lens for projecting the image from the image-generation device, and a body for housing the light source, the image-generation device, and the projection lens. The image display device may also include a cooling system positionable in a first position and a second position based on a configuration of the body.

BRIEF DESCRIPTION OF THE FIGURES

FIG. 10 is a flowchart illustrating an exemplary method for operating a cooling system.

DETAILED DESCRIPTION

Figure 1:
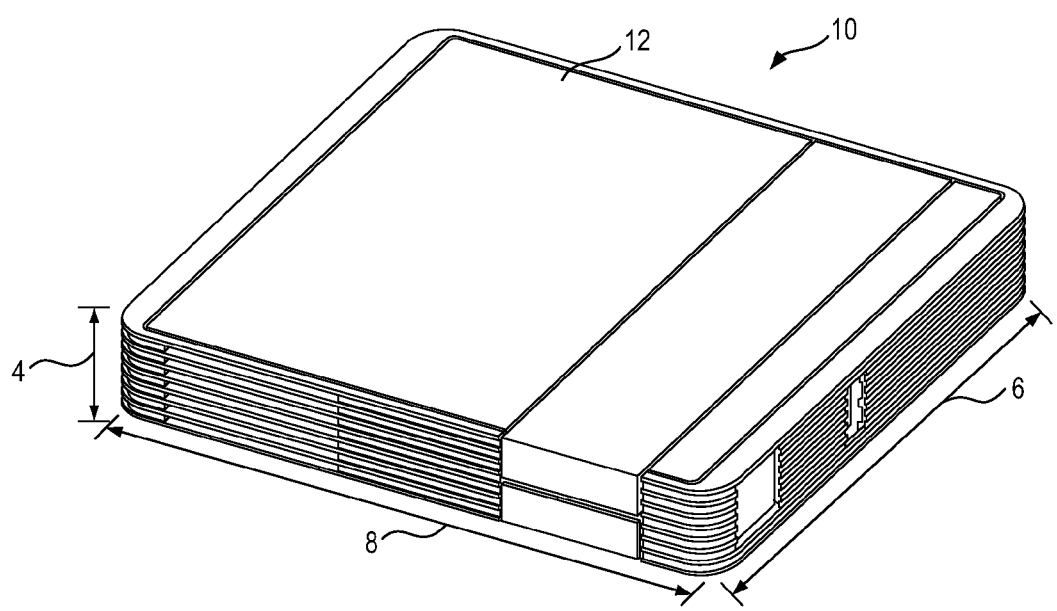
FIG. 1 is a perspective view of an exemplary image display device.

Referring initially to FIG. 1, the drawing illustrates an exemplary image display device 10 having a body 12 (e.g., housing) having a height 4, a width 6 and a length 8. As discussed in more detail below, the footprint (e.g., base surface area) of the image display device 10 may be minimized through use of a cooling system capable of being collapsed, folded, or otherwise positioned in more than one position, as described below. It may be appreciated that similar components are numbered with like numbers throughout the figure descriptions below.

Although cooling systems are described herein in regards to the image display device being an LED system or LED display device, it may be appreciated that such cooling systems may be integrated into other suitable image display devices which use alternative light sources. Moreover, although described in regards to use within an image display device, the cooling system may be used for other applications for which cooling is desired, including computers, laptop computers, personal computers, cameras, telephones, appliances, etc. Further, the display device may be a stand-alone display device or it may be incorporated into another device, including computers, cameras, telephones, personal data assistants, etc. Further still, the shape and/or ornamental design of the image display device as illustrated in the drawings is exemplary, and the image display device may be any suitable shape or design.

Figure 2:
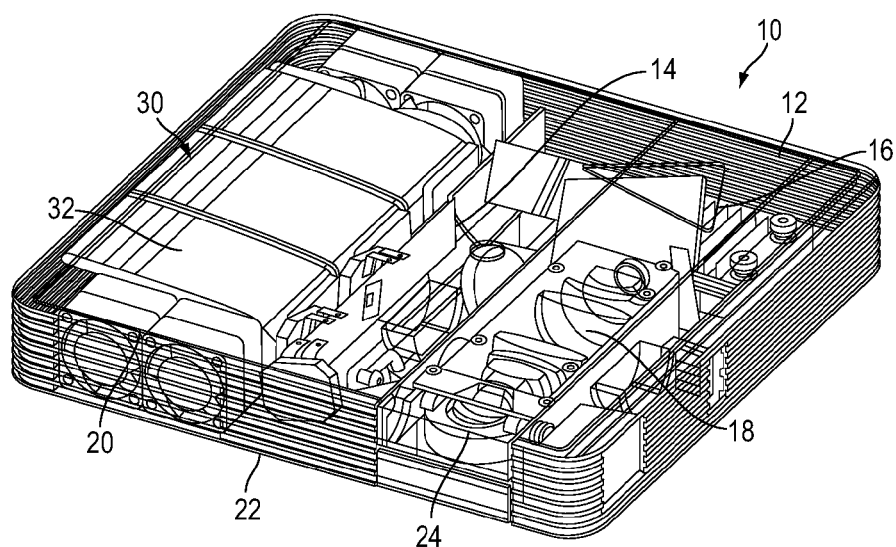
FIG. 2 is a perspective view of an image display device in a first configuration according to an embodiment of the present disclosure.

Referring now to FIG. 2, image display device 10 includes a body 12, which is illustrated as transparent for ease of description of the components of the image display device 10, in this example. Contained within the body 12 may be a light assembly 14, including one or more light sources linked to an image generation device 16, such as a light valve, or spatial light modulator, or other image generating device. The light assembly 14 may be adapted to produce one or more beams of light and project the light towards the image-generation device 16, which may be configured to generate and project an image. Using LEDs as the one or more light sources, the image display device 10 may be able to provide an illumination of 200-300 lumens, in some examples. In other examples, an illumination of more than 300 lumens may be provided by an image display device.

The image-generation device 16 may be configured to receive the light from the light source(s) and generate an image to be projected. The image-generation device 16 may include an optical engine, image-producing elements, filters, lenses, mirrors, integrators, condensers, and other suitable optical elements. Such elements may be configured to generate an image. For example, the image generation device 16 may include an image-producing element, such as a digital micromirror (DMD), an LCD panel, or any other suitable image source. In some embodiments, the image-producing element may be configured to project light toward one or more lenses, mirrors or other optics which, in turn, may be configured to project light toward a display surface.

In this example, the light from light assembly 14 may be directed along a light path through a projector lens, such as projection lens elements 18 and 24. The body 12 may also include a cooling assembly 30 described in detail below. It may be appreciated that the projection lens elements 18 and 24 may be less than 100 mm in length in some examples, and longer in other examples. It may be further appreciated that a projection lens may be any suitable device for directing light from a light source to a display. That is, although a projection lens of a projector is described as an example herein, a projection lens may be any suitable device for directing light from a light source to a display, such as a suitable device or assembly in a television.

Further, the image display device 10 may be configured to project an image with a 2:1 projection ratio, or aspect ratio, though any other suitable projection ratio may be achieved. The image display device 10 may be configured to provide XGA and WXGA (wide XGA) DMD options, such that any suitable aspect ratio and/or other image options can be provided. In one example, the throw distance of the image display device 10 may be between 1-4 feet, though any suitable throw distance is possible in other examples.

The reconfiguration of the body 12 of the image display device 10 will now be described. FIG. 2 illustrates the body 12 of image display device 10 in a first configuration. This first configuration may be considered a folded, closed, or storage configuration where the height of the body 12 is minimized, or reduced. A top surface 20 may be positioned against the device to form a reduced-sized body 12 such that the distance from the top surface 20 to the bottom surface 22 is minimized, or reduced. In some examples, the height of the body 12 may be up to 1 inch in height in the storage configuration. The length and width dimensions of the image display device 10 may be any suitable values.

In this first storage configuration of the body 12, one or more components of the image display device 10 may be in a storage position. As an example, a portion of the projection lens, e.g. projection lens elements 24, may be in a lens storage position facing a bottom of the body 12 as shown in FIG. 2. Other lenses and/or other components may similarly be in a storage position when the body 12 is in the first storage configuration.

Figure 3:
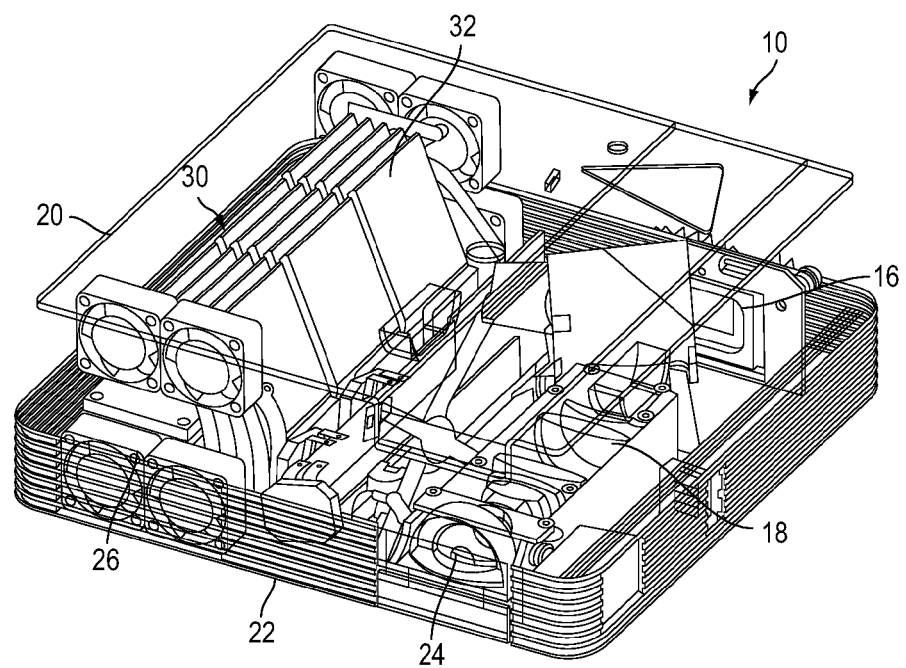
FIG. 3 is a perspective view of an image display device in a second configuration according to an embodiment of the present disclosure.

The body 12 of the image display device 10 may be moved, unfolded, and/or expanded to the second operation configuration, shown in FIG. 3, which may be considered as the display device operation configuration or open configuration. In the second operation configuration, the top surface 20 may be separated from the top edge 26 of the device such that the distance between the bottom surface 22 and the top surface 20 is increased to approximately 2.5 inches, in one example. The length and width dimensions of the image display device may or may not change between the first and second configuration of the body. In another example, one or more of the width and height dimensions of the body 12 may change in size.

Moving the body 12 to the second operation configuration (e.g., operation position) may result in one or more additional components of the image display device 10 moving from a storage position to an operation position. For example, a portion of the projection lens, such as projection lens element 24, may be configured to rotate, or pivot about a length-wise axis, from the first lens storage position shown in FIG. 2 to a second lens operation position shown in FIG. 3. As illustrated, the projection lens element 24 may flip into the lens operation position to thereby face a side of the body 12 upon positioning of the body 12 in the second operation configuration. Further, the light path of image display device 10 may be defined for use when the body 12 is in the second operation configuration, or when the components of the image display device 10 are in respective operation positions. In other examples, the projection lens element 24 may be configured to pivot about any suitable axis so as to be positioned in a suitable lens storage position when the body 12 is in the first storage configuration, and so as to be positioned in a lens operation position when the body 12 is in the second operation configuration.

The ability to move the body 12 of the image display device 10 between a first and second configuration enables the size of the image display device 10 to be minimized or reduced when not in use.

Referring again to FIG. 2, a cooling system 30 is coupled to the body of the image display device 10. The cooling system 30 is shown in the first storage position (e.g., a folded or collapsed position) in FIG. 2 and in the second operation position (e.g., an expanded position) in FIG. 3. The cooling system 30 may be movable, or transitionable between the first storage position and the second operation position. The cooling system 30 may be any cooling system configured to be positioned in more than one position.

Furthermore, the cooling system may be positioned in one of its plurality of positions based on a configuration of the body 12. That is, as the body 12 of image display device 10 is unfolded from the first storage configuration of FIG. 2 to the second operation configuration of FIG. 3, the cooling system 30 may smoothly move from the first storage position to the second operation position without further user input. Likewise, the cooling system 30 may be configured to be transitioned from the second operation position to the first storage position based on a movement of the body 12 (e.g., by depression of the top surface 20 of the body 12). In other examples, additional user input, such as an unlocking of a lock, may be implicated for the movement of the cooling system 30.

Although shown in a fully articulated display system, it may be appreciated that a cooling system may be integrated into other types of display systems, including systems with little or no articulation. For example, the cooling system 30 may be integrated into a more fixed-sized display system (e.g., a fixed-size body) and/or into a system which does not have other components that transition between operation and storage positions. For example, the system may not include a pivotable projection lens as described above.

The cooling system 30 may include movable (e.g., collapsible, bendable, foldable, etc.) cooling fins 32 coupled to heat pipes, in one example. In contrast to systems which have a fixed sized cooling assembly (e.g. having substantially fixed-sized heatpipes and fins), the collapsible cooling fins enable the size of the display device to be minimized or reduced when the cooling assembly 30 or the image display device 10 is not in use.

It is noted that larger cooling fins may be implemented in a collapsible, or movable, cooling system compared to cooling fins implemented in a non-collapsible, or non-movable, cooling system since the cooling fins are repositionable into a storage position in the collapsible cooling system. Larger fins have more cooling surface area than do smaller fins, thereby allowing greater heat dissipation and hence more cooling capacity. As an example, the fins may be folded (e.g., along an elongated portion of the fins) such that the overall height of the cooling fins is reduced for storage and then unfolded or expanded for use. Thus, the collapsible cooling system with the foldable fins may be used in an image display device where the height is minimized or reduced, such as in an LED display device that is less than one inch in height.

Figure 4:
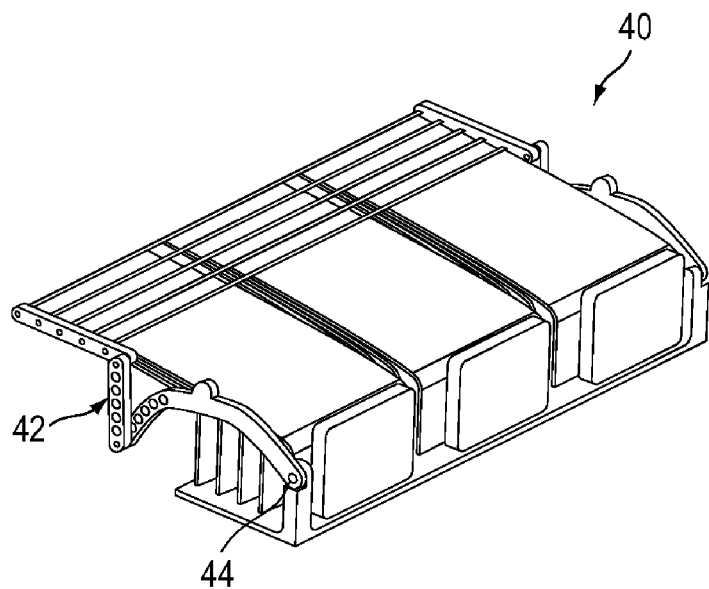
FIG. 4 is an illustration of an example cooling assembly in a storage position according to an embodiment of the present disclosure.

FIG. 4 provides another view of a collapsible cooling system or assembly, such as cooling system 30 of FIGS. 2 and 3. Indicator 40 illustrates the cooling system in a first position (e.g., a folded or storage position). In some embodiments, the cooling fins (e.g., the tops of the fins) may be coupled together by a common frame of pivot points. The common frame may include linking assembly 42 having any number of link members, to control the movement of the cooling fins. In this example, linking assembly 42 couples a bottom piece of the common frame to a top piece of the common frame such that the top piece is fixedly connected to a top portion of the cooling fins. Linking assembly 42 links the cooling fins such that the pivot points at which the cooling fins are bent or folded are located on a common axis. That is, when the linking assembly 42 pivots at pivot point 44, each of the substantially continuous cooling fins can bend, or fold, at a pivot point on an axis common to pivot point 44. In another example, each of the cooling fins can bend or fold at an axis parallel to an axis extending from pivot point 44. Linking assembly 42 may be understood to be exemplary and non-limiting. The frame and cooling fins may move in any suitable motion, together or independently based on the configuration of the frame, fins, and linking members.

Figure 5:
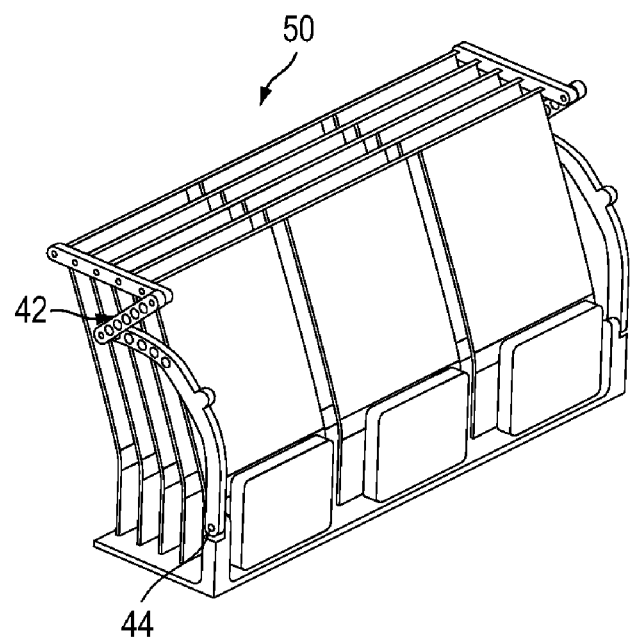
FIG. 5 is an illustration of an example cooling assembly in an operation position according to an embodiment of the present disclosure.

FIG. 5 illustrates the collapsible cooling system 50 in a second operation position, an expanded position. Here, the cooling fins have been moved to the second operation position by way of the linking assembly 42, which is respectively in a second position. In the examples illustrated in FIG. 4 and FIG. 5, a plurality of cooling fins is illustrated. However it may be understood that less than, or greater than four cooling fins may be employed in such a cooling system.

Figure 6:
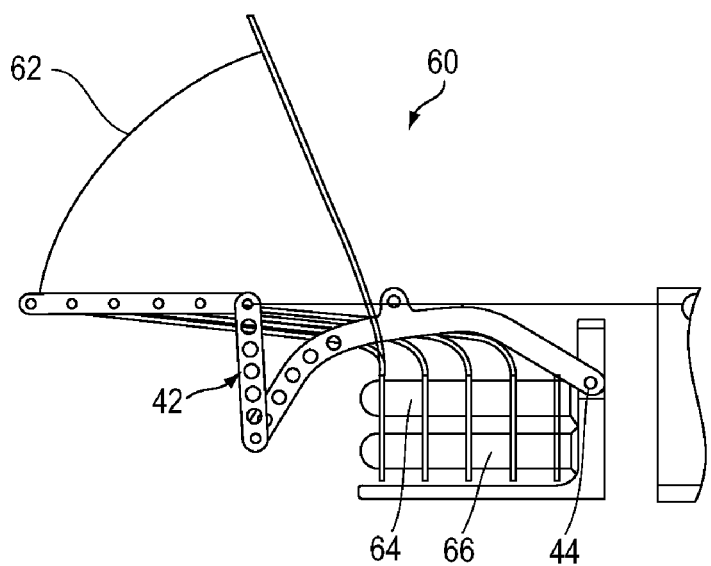
FIG. 6 is a side view of an example cooling assembly in a storage position according to an embodiment of the present disclosure.
Figure 7:
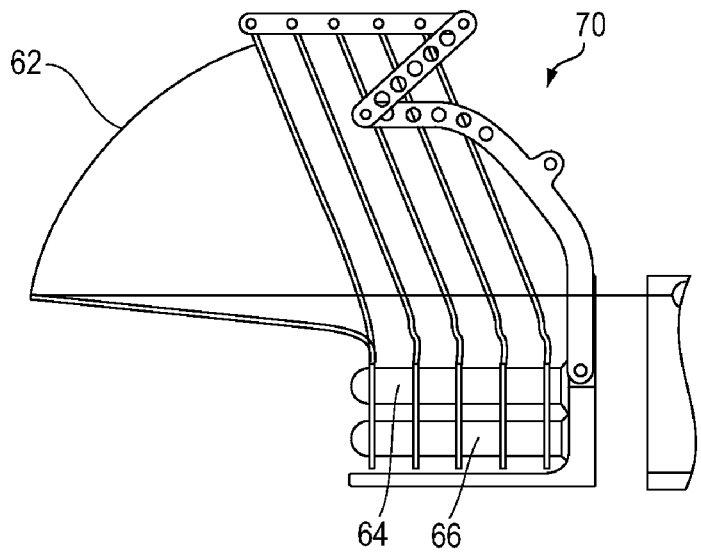
FIG. 7 is a side view of an example cooling assembly in an operation position according to an embodiment of the present disclosure.

FIG. 6 illustrates a side view of a collapsible cooling system. Indicator 60 illustrates the collapsible cooling system in a first storage position, a folded position. FIG. 7 illustrates at 70 a collapsible cooling system in a second operation position. As illustrated, one or more of the cooling fins may be coupled to one or more heating pipes, such as heating pipe 64 and heating pipe 66. In other examples, the one or more cooling fins may not be coupled to a heating pipe, and the rods indicated by reference numerals 64 and 66 may act as connectors to couple the cooling fins to each other, such that the cooling fins move together. Such connectors may be any suitable connection device or system, such as compression-fitted connectors, bolts, etc.

An arc indicated at 62 illustrates an arc of motion by which the leftmost cooling fin of FIG. 6 and FIG. 7 may move between the first storage position illustrated in FIG. 6 and the second position illustrated in FIG. 7. The remaining cooling fins may move in an arclike motion parallel to that of the arc indicated at 62, such that the fins act in a parallelogram motion when closing. Thus, a cooling fin may be positionable based on a position of a different cooling fin.

As shown, the fins may be flexible cooling fins. The fins may have a spring-like property such that they flex between the two positions. For example, the fins may be composed of sheet metal, such as beryllium-copper, aluminum alloys, or other suitable materials. The cooling fins further may be of a material which has an effective coefficient of thermal dissipation. However, such example materials are provided for illustration purposes and may include other suitable materials, such as other suitable springy materials or foldable materials.

In one example, the cooling fins may be flexible such that they may be bent or gently folded when in the storage position. One or more of the cooling fins may be partially or substantially fully overlapped, or folded, in the first storage position such that the surface area and the cooling potential of the cooling fins can be improved during operation in the second position.

It is noted that depending on the material used for the cooling fins, a large bend radius for the cooling fins may be used such that the bend radius is low on the stress-strain curve of the chosen material. A large bend radius may reduce the stress-strain on the cooling fins and prevent the cooling fins from any material fatigue cracking.

Although described where each cooling fin is a continuous metal sheet with a bend, in some embodiments, the cooling fins may have multiple sheets or sections. In such a case, the cooling fin may be foldable from the second position to the first position. The sections of the cooling fins may move together or may move independent of the other sections. In one example, a cooling fin having more than one section may be folded upon itself, like an accordion. Further, in some embodiments, different cooling fins may move independently of other cooling fins, or more than one frame may be used.

Figure 8:
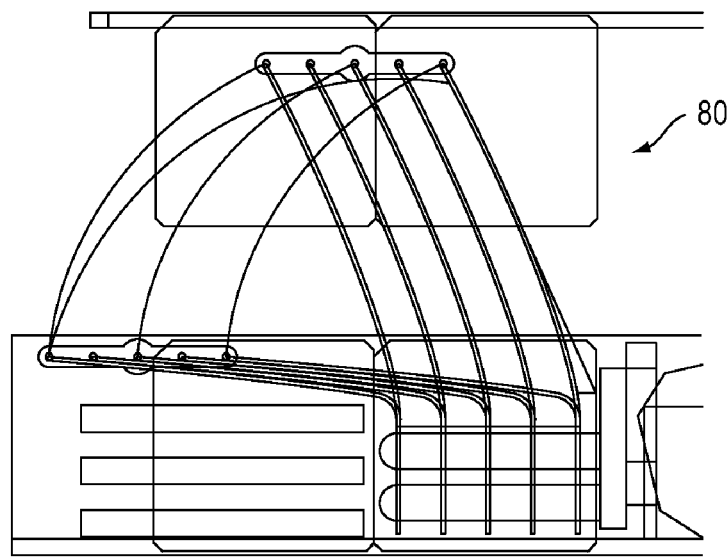
FIG. 8 is a line drawing illustration of an example cooling assembly as it moves between a storage position and an operation position according to an embodiment of the present disclosure.

FIG. 8 provides another illustration of a collapsible cooling system. Indicator 80 illustrates a line drawing of the collapsible cooling system as it moves between a first storage position, and a second operation position.

Figure 9:
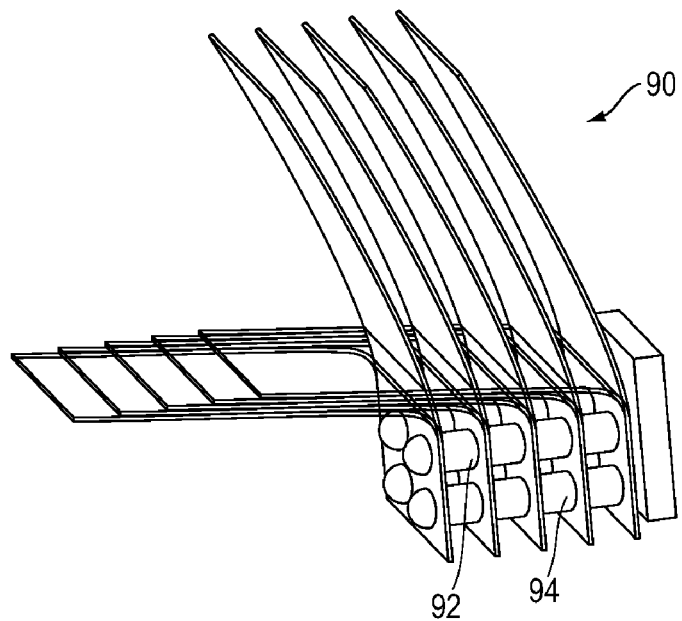
FIG. 9 is an illustration of cooling fins of an example cooling assembly according to an embodiment of the present disclosure.

FIG. 9 provides yet another illustration at 90 of the cooling fins in the second position, absent a linking assembly. Here, connector 92 and connector 94 couple the cooling fins together. In such an example, the cooling fins may be bent by mechanical compression of the cooling fins via user input, for example. In another example, an electronic signal may be sent to close an upper surface of a housing of an image display device, and a closing movement of the upper surface may compress the cooling fins, thereby bending or folding the cooling fins at their respective pivot points. Any other suitable mechanism for initiating a bending or folding of the cooling fins may be implemented.

As described, in some embodiments, the fins may move from a nearly 90 degree bend in the collapsed position, to a nearly unbent, straight position when the fins are in an open, cooling position. In some embodiments, the cooling fins may employ bi-directional folding. For example, in a bi-directional folding embodiment, one or more of the fins may be bent approximately the same number of degrees in both the open and closed positions. As such in some embodiments, in the collapsed position, the base of the fins, connected to the heat pipes, may be angled (for example at 35 degrees up from the projector base), and the fins may be folded or bent down by 35 degrees (for example) to be horizontal (parallel with the projector base). Upon movement to an operational position, the fins may move from the 35 degree bend in one direction, to straight, to a 35 degree bend in the other direction. Thus, the fins have may move a total of 70 degrees, where the fins did not have to move more than 35 degrees away from a straight shape. In such an embodiment, the overall bend angle is reduced by 20 degrees in comparison to the 90 degree bend embodiments. The bi-directional folding embodiments may reduce fin fatigue and increase resistance to fatigue cracking of the folding fins. For example, increase resistance to cracking of the fin material, such where the fins are aluminum or other similar material, may be provided with the bi-directional folding embodiments.

In other embodiments, additional folds may be provided to further enable additional collapsing, reduce fin fatigue or provide for durability of the product. For example, multiple fold points may be provided. Different fold angles may enable the fins to move into operation and collapsed positions.

Referring now to FIG. 10, a flowchart illustrates a method 1000 for operating a cooling system. The method 1000 may include positioning, at 1002, a cooling system coupled to an image display device, or another suitable device, in a first position. In one example, the first position may be an operation position, such that a cooling system can effectively cool the image display device to which it is coupled.

The method 1000 may include releasing the cooling system from the first position at 1004. Such a release may occur by actuation of a release button, snap, compression fitting, or sliding clasp, as just some examples. Other suitable devices for releasing a cooling system may be employed. Further still, the release may be executable by application of pressure or forces to the cooling system and/or to the image display device.

Responsive to the release of the cooling system from the first position, the method 1000 may include collapsing the cooling system to a second position at 1006, where the second position may be a storage position.

In some examples, the cooling system may include a substantially continuous cooling fin. In such a case, the collapsing of 1006 may include bending the substantially continuous cooling fin from the first position (e.g., an operation position) to the second position (e.g., a storage position). In another example, the cooling system may include a cooling fin having at least two sections, and the collapsing may include folding the cooling fin from the first position (e.g., an operation position) to the second position (e.g., a storage position).

Further still, the cooling system may include a plurality of cooling fins, such as a first cooling fin and a second cooling fin, and each cooling fin may have a unique pivot point. That is, the collapsing at 1006 may include pivoting a first cooling fin of the cooling system at a first pivot point and pivoting a second cooling fin of the cooling system at a second pivot point. In still other examples, one or more cooling fins may have a common pivot point.

An exemplary cooling system may include a common frame of pivot points coupling a first cooling fin and a second cooling fin of the cooling system. The common frame may have one or more link members coupling a bottom piece of the common frame to a top piece of the common frame, where the top piece of the common frame is fixedly connected to a top portion of the first cooling fin and a top portion of the second cooling fin. As such, the collapsing of 1006 can include moving the common frame of pivot points to effectively collapse the cooling system.

A second cooling fin (or third, fourth, etc.) may be collapsed based on a movement of a first cooling fin. For example, this may occur via the coupling of the common frame of pivot points described above. A first cooling fin may be moved in an arc-like motion, and a second cooling fin may be moved in a substantially parallel arc-like motion. Further, the first and second cooling fins may partially or substantially fully overlap in the second storage position. The fins may be collapsed or fold such with approximate 90 degree fold, a bi-directional fold, a multi-directional fold, or other manner where the fins transition between at least a first position and a second position, such as an operation and storage position.

In some examples, the method 1000 may include moving the cooling system based on a cooling mode of the image display device, or another device to which it may be coupled. A cooling mode may indicate a mode of operation or non-operation (e.g., storage). For example, the positioning of the cooling system in the first position described above with respect to FIG. 10 may occur during a "no cooling, operation", "low cooling, operation" or "high cooling, operation" cooling mode. The cooling system may be moved to the second position described with respect to FIG. 10 when a "no cooling, storage" cooling mode is desired.

It may be appreciated that the illustrated components of the image display device and ornamentations thereof as shown in the figures are exemplary. One or more components may be removed and/or added while an intended functionality of the image display device (e.g., to effectively display an image) and/or cooling system (e.g. to effectively cool a device or system) is maintained.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein.

Inventions embodied in various combinations and subcombinations of features, functions, elements, and/or properties may be claimed in a related application. Such claims, whether they are directed to a different invention or directed to the same invention, whether different, broader, narrower or equal in scope to any original claims, are also regarded as included within the subject matter of the inventions of the present disclosure.

The invention claimed is:

1. An image display device comprising:
   a light source;
   an image-generation device for receiving light from the light source and generating an image;

a projection lens for projecting the image from the image-generation device;

a body for housing the light source, the image-generation device, and the projection lens; and a cooling system coupled to the body, the cooling system comprising a plurality of substantially parallel cooling fins, the cooling fins positionable in a first position and a second position based on a configuration of the body, wherein adjacent cooling fins in the plurality are moved toward each other into a storage position when positioned in the first position, and wherein the adjacent cooling fins are separated when positioned in the second position, where a cooling fin of the plurality comprises substantially one continuous sheet bendable between the first position and the second position.

2. The image display device of claim 1, where the body is movable between a first storage configuration and a second configuration, and where the cooling system is positionable in the first position when the body is in the first configuration and the cooling system is positionable in the second position when the body is in the second configuration.

3. The image display device of claim 1, wherein adjacent cooling fins of the plurality are in a collapsed configuration when positioned in the first position and wherein the adjacent cooling fins are spaced apart in an operation position when positioned in the second position.

4. The image display device of claim 1, where a portion of the projection lens is pivotable between a first lens storage position and a second lens position.

5. The image display device of claim 1, where a cooling fin of the plurality comprises at least two sections, the cooling fin being foldable between the first position and the second position.

6. The image display device of claim 1, where a first cooling fin of the plurality is coupled to a second cooling fin of the plurality by a common frame of pivot points.

7. A cooling system for an image display device, the cooling system comprising:

a plurality of substantially parallel cooling fins, the cooling fins positionable in a first position and a second position based on a configuration of the body, wherein adjacent cooling fins in the plurality are moved toward each other into a storage position when positioned in the first position and the adjacent cooling fins are separated when positioned in the second position, and wherein a first cooling fin of the plurality is coupled to a heat pipe of the image display device, the first cooling fin being positionable based on a cooling mode of the image display device, where the first cooling fin is a substantially continuous sheet bendable between the first storage position and the second position.

8. The cooling system of claim 7, where the first cooling fin includes at least two sections, and where the first cooling fin is foldable between the first storage position and the second position.

9. The cooling system of claim 7, where the cooling mode is one of a discrete number of cooling modes.

10. The cooling system of claim 7, wherein a second cooling fin of the plurality is coupled to the first cooling fin by a common frame of pivot points, the second cooling fin being positionable based on a position of the first cooling fin.

11. The cooling system of claim 10, where the common frame of pivot points includes link members coupling a bottom piece of the common frame to a top piece of the common frame, the top piece of the common frame being fixedly connected to a top portion of the first cooling fin and a top portion of the second cooling fin.

12. The cooling system of claim 10, where the first cooling fin and the second cooling fin are overlapped in the first storage position.

13. A method for operating a cooling system, the method comprising:

providing a cooling system coupled to an image display device, the cooling system comprising a plurality of substantially parallel cooling fins, the cooling fins positionable in a first position and a second position, wherein adjacent cooling fins are moved toward each other when positioned in the first position, and wherein adjacent cooling fins are separated when positioned in the second position positioning the cooling system in the second position;

releasing the cooling system from the second position; and collapsing the cooling system to the first position, responsive to the release of the cooling system from the second position, where the cooling system includes a substantially continuous cooling fin, and where the collapsing includes bending the substantially continuous cooling fin from the second position to the first position.

14. The method of claim 13, where the first position is a storage position and the second position is an operation position.

15. The method of claim 13, where the cooling system includes a cooling fin having at least two sections, and where the collapsing includes folding the cooling fin from the second position to the first position.

16. The method of claim 13, where the collapsing includes pivoting a first cooling fin of the plurality at a first pivot point and pivoting a second cooling fin of the plurality at a second pivot point.

17. The method of claim 13, where the collapsing includes moving a common frame of pivot points coupling a first cooling fin of the plurality and a second cooling fin of the plurality, the common frame having link members coupling a bottom piece of the common frame to a top piece of the common frame, the top piece of the common frame being fixedly connected to a top portion of the first cooling fin and a top portion of the second cooling fin.

* * * * *